(12) United States Patent
Lu et al.

(10) Patent No.: US 11,015,735 B2
(45) Date of Patent: May 25, 2021

(54) VALVE SYSTEM

(71) Applicant: SHIMADZU CORPORATION, Kyoto (JP)

(72) Inventors: Wenjian Lu, Kyoto (JP); Shigeaki Shibamoto, Kyoto (JP); Jun Yanagibayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/217,523

(22) Filed: Dec. 12, 2018

(65) Prior Publication Data
US 2019/0219194 A1 Jul. 18, 2019

(30) Foreign Application Priority Data

Jan. 18, 2018 (JP) .............................. JP2018-006419

(51) Int. Cl.
F16K 99/00 (2006.01)
F16K 31/128 (2006.01)

(52) U.S. Cl.
CPC ........ *F16K 99/0015* (2013.01); *F16K 31/128* (2013.01); *F16K 99/0059* (2013.01)

(58) Field of Classification Search
CPC ............. F16K 99/0015; F16K 99/0059; F16K 31/126; F16K 31/1266; F16K 31/128
See application file for complete search history.

(56) References Cited

U.S. PATENT DOCUMENTS 2,895,810 A * 7/1959 Casey, Jr. ............... C01B 33/46
210/138
3,517,697 A * 6/1970 Holzschuh ......... G05D 16/0666
137/625.33
3,774,637 A * 11/1973 Weber ................... F16K 31/126
137/625.6

(Continued)

FOREIGN PATENT DOCUMENTS

CN 1437560 A 8/2003
CN 103140166 A 6/2013

OTHER PUBLICATIONS

Communication dated Sep. 21, 2020, issued by the State Intellectual Property Office of the P.R.C. in application No. 201910035270.9.

(Continued)

*Primary Examiner* — Kevin F Murphy
*Assistant Examiner* — Jonathan J Waddy
(74) *Attorney, Agent, or Firm* — Sughrue Mion, PLLC

(57) ABSTRACT

A first flow path is connected to an inlet for introducing gas into a microvalve. A second flow path is connected to an outlet for allowing gas to flow out of the microvalve. A third flow path is for introducing a pneumatic fluid into the microvalve. A negative pressure generation mechanism (a pump) is for generating a negative pressure on the second flow path to suck gas from the first flow path forward the second flow path via the microvalve. A pressure adjustment mechanism (a connection flow path and a valve) is for reducing a pressure difference between the second flow path and the third flow path to prevent the inlet and the outlet from being blocked by a diaphragm layer in response to the negative pressure generated on the second flow path side.

6 Claims, 13 Drawing Sheets

(56) References Cited

U.S. PATENT DOCUMENTS

| | | | | |
|---|---|---|---|---|
| 4,390,036 | A * | 6/1983 | Athanassiu | F16K 7/18 137/116.5 |
| 4,480,653 | A * | 11/1984 | Vanderburg | F16K 37/0091 137/112 |
| 5,042,775 | A * | 8/1991 | Willemsen | F16K 31/402 251/30.02 |
| 5,181,538 | A * | 1/1993 | Manganaro | E03C 1/04 137/607 |
| 5,887,847 | A * | 3/1999 | Holborow | F16K 31/128 251/33 |
| 6,056,269 | A * | 5/2000 | Johnson | F15C 5/00 251/331 |
| 6,227,809 | B1 * | 5/2001 | Forster | F04B 43/046 417/413.2 |
| 6,293,012 | B1 * | 9/2001 | Moles | B01L 3/502707 29/890.124 |
| 6,384,509 | B1 * | 5/2002 | Tomonari | F15C 5/00 310/307 |
| 7,862,002 | B2 * | 1/2011 | Naitoh | F16K 31/1221 251/63.6 |
| 10,704,701 | B1 * | 7/2020 | Yu | F16K 31/046 |
| 10,774,936 | B2 * | 9/2020 | Mall | F16K 7/126 |
| 2002/0139947 | A1 * | 10/2002 | Wang | F15C 5/00 251/61 |
| 2003/0030023 | A1 * | 2/2003 | Wang | F15C 5/00 251/331 |
| 2003/0175162 | A1 | 9/2003 | Anazawa et al. | |
| 2008/0128025 | A1 * | 6/2008 | Brown | E03B 1/042 137/9 |
| 2012/0021529 | A1 | 1/2012 | Nachef et al. | |
| 2013/0178752 | A1 | 7/2013 | Kodama et al. | |
| 2016/0169217 | A1 * | 6/2016 | Cavatorta | F04B 53/10 251/25 |
| 2016/0341330 | A1 * | 11/2016 | Sneh | F16K 7/16 |
| 2017/0351275 | A1 * | 12/2017 | Ito | G05D 16/2053 |

OTHER PUBLICATIONS

Communication dated Mar. 4, 2020 from the State Intellectual Property Office of the P.R.C. in application No. 201910035270.9.

* cited by examiner

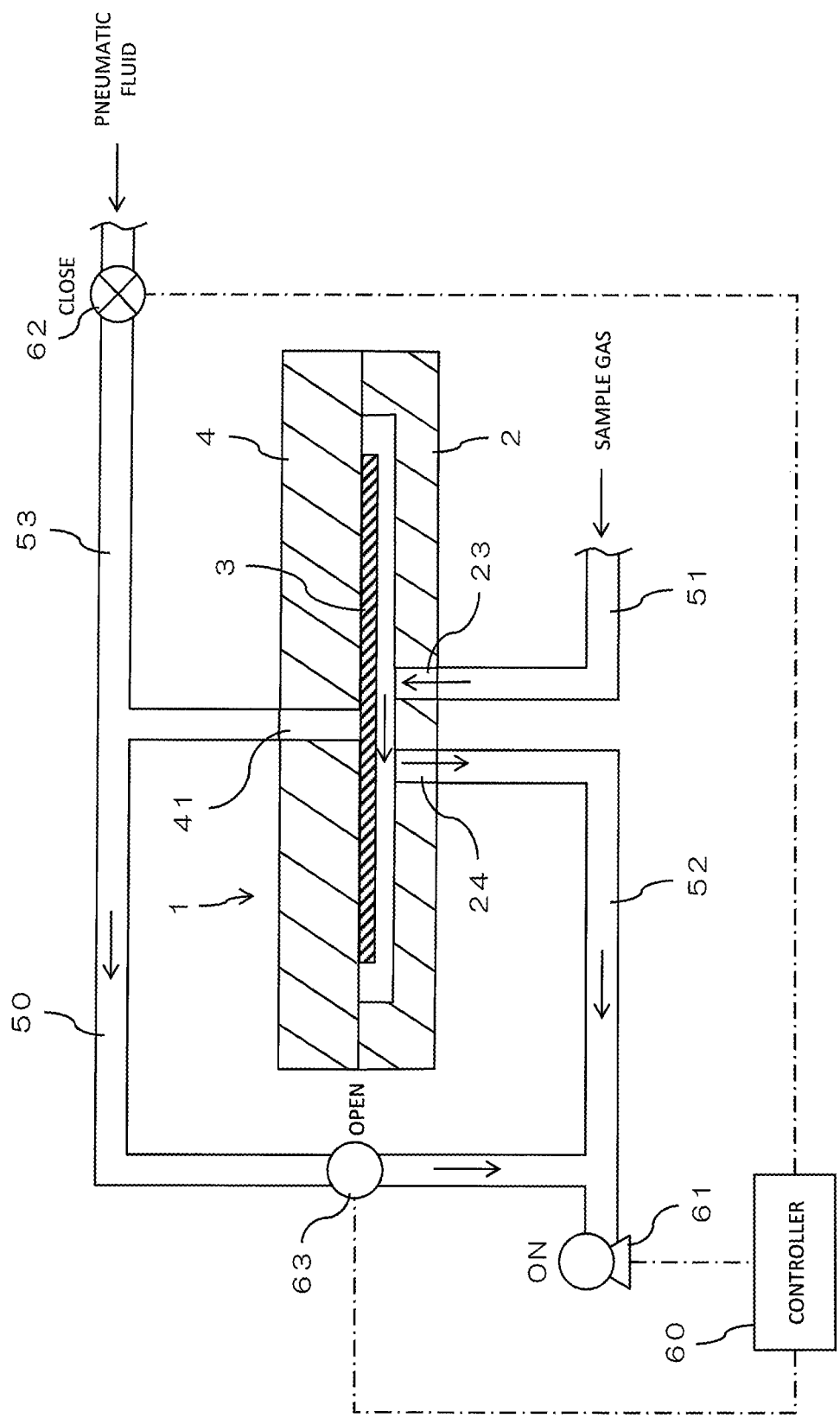

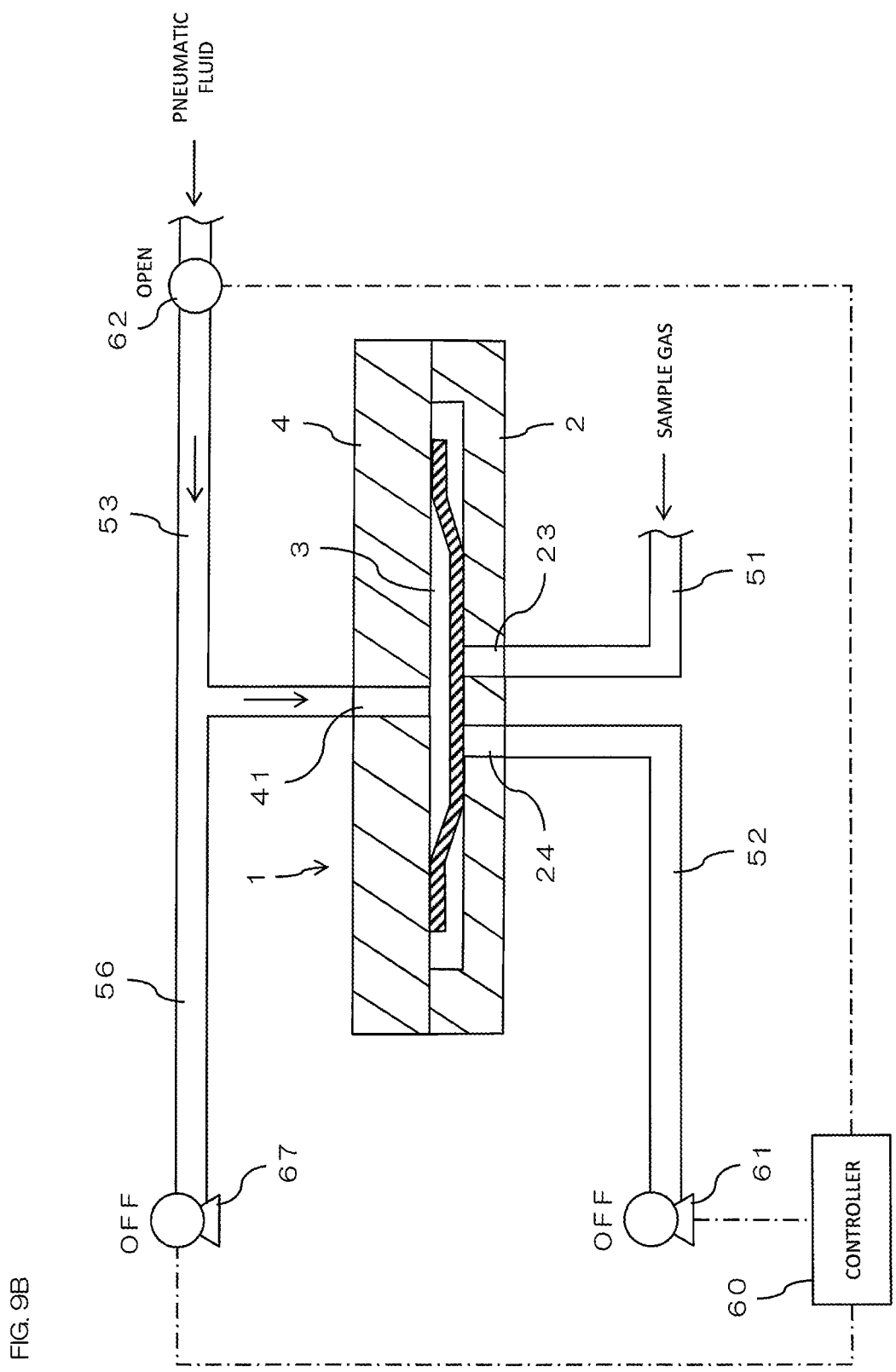

VALVE SYSTEM

CROSS REFERENCE TO RELATED APPLICATION

This application claims priority to Japanese Patent Application No. 2018-006419 filed on Jan. 18, 2018, the entire disclosure of which is incorporated by reference herein.

BACKGROUND OF THE INVENTION

Field of the Invention

The present invention relates to a valve system for opening and closing a flow path of gas by using a microvalve having a laminated structure in which a plurality of layers are included.

Description of the Related Art

In various types of apparatuses, valve devices have been used to open or close flow paths in the apparatuses. For example, a small-sized microvalve has been used for a chromatograph microinjector.

The microvalve has a laminated structure in which a plurality of layers are included, and the flow path is opened or closed by introducing a fluid such as gas (pneumatic fluid) into the microvalve (for example, see US 2012/0021529 A).

The microvalve described in US 2012/0021529 A includes a first layer, a second layer, and a displacement layer in a laminated structure. In this microvalve, the displacement layer is formed in a thin film shape, and the displacement layer is sandwiched between the first layer and the second layer. In the first layer, an inlet and an outlet are formed penetrating in a thickness direction. A gap is provided between the first layer and the displacement layer. While the microvalve is in an opened state, gas supplied from the inlet into the microvalve passes between the first layer and the displacement layer and flows out from the outlet. When the microvalve is to be brought into a closed state, in the current state, a pneumatic fluid is introduced from the second layer side toward the displacement layer. With this introduction, the displacement layer is pressed and deformed toward the first layer side to be brought into close contact with the first layer. The displacement layer thus blocks the inlet and the outlet, thereby closing the flow path in the microvalve. In this manner, the displacement layer functions as a diaphragm layer which is elastically deformed by introduction of the pneumatic fluid.

SUMMARY OF THE INVENTION

In the microvalve described in US 2012/0021529 A, the diaphragm layer is made of poly ether ether keton (PEEK), and the pneumatic fluid is introduced into the microvalve at a relatively high pressure, whereby the diaphragm layer is elastically deformed to block the inlet and the outlet. However, it is also conceivable to form the diaphragm layer with a thinner material that is more easily elastically deformed.

Meanwhile, as a method to supply gas from the inlet into the microvalve, there are a method of pressurizing the gas from the inlet side to flow the gas into the microvalve, and a method of generating a negative pressure on the outlet side to suck the gas from the inlet into the microvalve. In a valve system adopting the latter method, namely, the method of sucking the gas by the negative pressure, when the diaphragm layer is configured to be easily elastically deformed, at the time of sucking the gas from the inlet, the diaphragm layer may be elastically deformed to block the inlet and the outlet.

The present invention has been made in view of the above circumstances, and it is an object of the present invention to provide a valve system which can prevent an inlet and an outlet from being blocked by a diaphragm layer at the time of sucking gas in response to a negative pressure.

(1) A valve system according to the present invention includes a microvalve, a first flow path, a second flow path, a third flow path, a negative pressure generation mechanism, and a pressure adjustment mechanism. The microvalve has a laminated structure including a base layer on which an inlet and an outlet for gas are formed, a cover layer facing the base layer, and a diaphragm layer that is provided between the base layer and the cover layer and is elastically deformable in response to a flow of a pneumatic fluid, to block the inlet and the outlet. The first flow path is connected to the inlet for introducing gas into the microvalve. The second flow path is connected to the outlet for allowing gas to flow out of the microvalve. The third flow path is for introducing the pneumatic fluid into the microvalve. The negative pressure generation mechanism is for generating a negative pressure on the second flow path side to suck gas from the first flow path forward the second flow path via the microvalve. The pressure adjustment mechanism is for reducing a pressure difference between the second flow path and the third flow path to prevent the inlet and the outlet from being blocked by the diaphragm layer in response to the negative pressure generated on the second flow path side.

With such a configuration, the pressure difference between the inside of the second flow path that allows the gas to flow out of the microvalve and the inside of the third flow path introduces the pneumatic fluid into the microvalve decreases by the action of the pressure adjustment mechanism. As a result, it is possible to reduce elastic deformation of the diaphragm layer in response to the negative pressure generated on the second flow path side, so that at the time of sucking the gas by the negative pressure, the inlet and the outlet can be prevented from being blocked by the diaphragm layer.

(2) The pressure adjustment mechanism may include a connection flow path connecting the second flow path and the third flow path, and a valve that is operable to open and close the connection flow path.

With such a configuration, the pressure difference between the inside of the second flow path and the inside of the third flow path can be reduced with a simple configuration just to open and close the connection flow path by the valve.

(3) The valve system may further include a controller configured to cause the pneumatic fluid to be supplied into the microvalve with the connection flow path being closed with the valve, and causes the supply of the pneumatic fluid into the microvalve to be stopped with the connection flow path being opened with the valve.

With such a configuration, in a state in which the supply of the pneumatic fluid into the microvalve is stopped, the connection flow path is opened with the valve, to decrease the pressure difference between the inside of the second flow path and the inside of the third flow path. Thus, at the time of reducing the pressure difference between the inside of the second flow path and the inside of the third flow path, it is possible to prevent the pneumatic fluid from flowing from the second flow path to the third flow path via the connection flow path.

(4) The diaphragm layer may be formed of a glass film having a thickness of 5 to 20 μm. In this case, the diaphragm layer may be elastically deformable at a pressure of 5 to 600 kPa received from the pneumatic fluid to block the inlet and the outlet.

With such a configuration, it is possible to form the diaphragm layer with a relatively thin glass film and elastically deform the diaphragm layer at a relatively low pressure to block the inlet and the outlet. In this case, there is a concern that the diaphragm layer is elastically deformed at the time of sucking the gas from the inlet, to block the inlet and the outlet. However, according to the present invention, it is possible to reduce elastic deformation of the diaphragm layer by the action of the pressure adjustment mechanism, so that at the time of sucking the gas by the negative pressure, the inlet and the outlet can be reliably prevented from being blocked by the diaphragm layer.

(5) The diaphragm layer may be formed of a silicon film having a thickness of 10 to 150 μm. In this case, the diaphragm layer may be elastically deformable at a pressure of 20 to 1000 kPa received from the pneumatic fluid to block the inlet and the outlet.

With such a configuration, it is possible to form the diaphragm layer with a relatively thin silicon film and elastically deform the diaphragm layer at a relatively low pressure to block the inlet and the outlet. In this case, there is a concern that the diaphragm layer is elastically deformed at the time of sucking the gas from the inlet, to block the inlet and the outlet. However, according to the present invention, it is possible to reduce elastic deformation of the diaphragm layer by the action of the pressure adjustment mechanism, so that at the time of sucking the gas by the negative pressure, the inlet and the outlet can be reliably prevented from being blocked by the diaphragm layer.

According to the present invention, it is possible to reduce elastic deformation of the diaphragm layer in response to the negative pressure generated on the second flow path side, so that at the time of sucking the gas by the negative pressure, the inlet and the outlet can be prevented from being blocked by the diaphragm layer.

BRIEF DESCRIPTION OF THE DRAWINGS

FIG. 7A is a schematic view showing a configuration example of a valve system by using the microvalve shown in FIGS. 1 to 6, showing a state in which the microvalve is opened;

FIG. 9B is a schematic view showing a modified example of the valve system, showing a state in which the microvalve is closed.

DETAILED DESCRIPTION OF THE PREFERRED EMBODIMENT

1. Configuration of Microvalve

Figure 1:
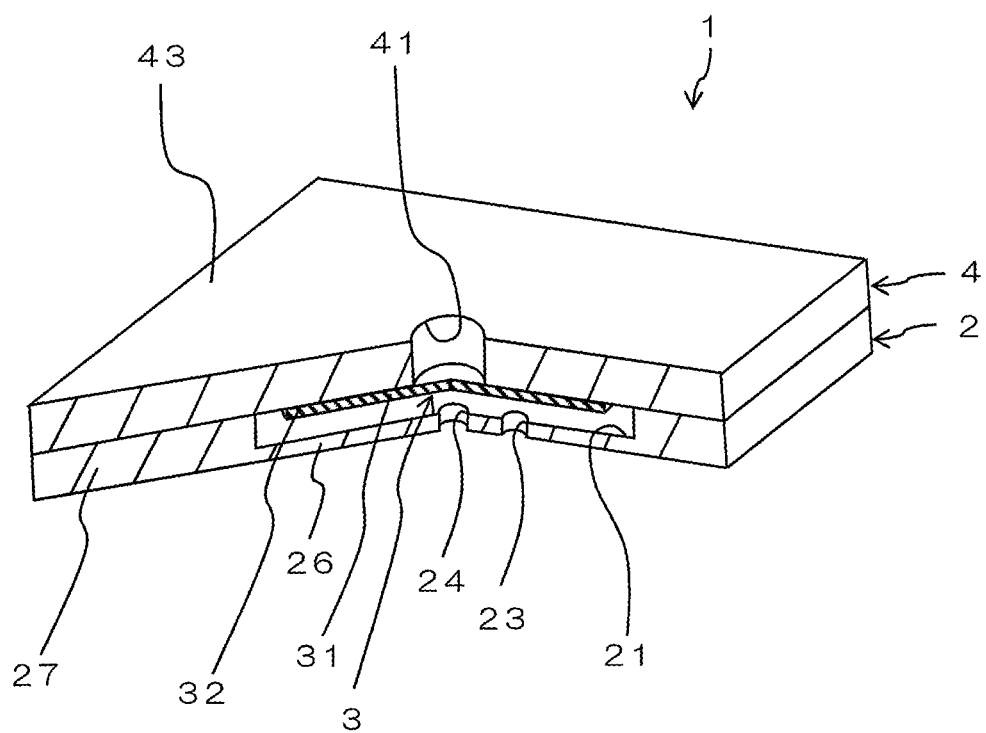
FIG. 1 is a perspective view showing a configuration example of a microvalve according to one embodiment of the present invention, showing a state in which the microvalve is viewed from above.
Figure 2:
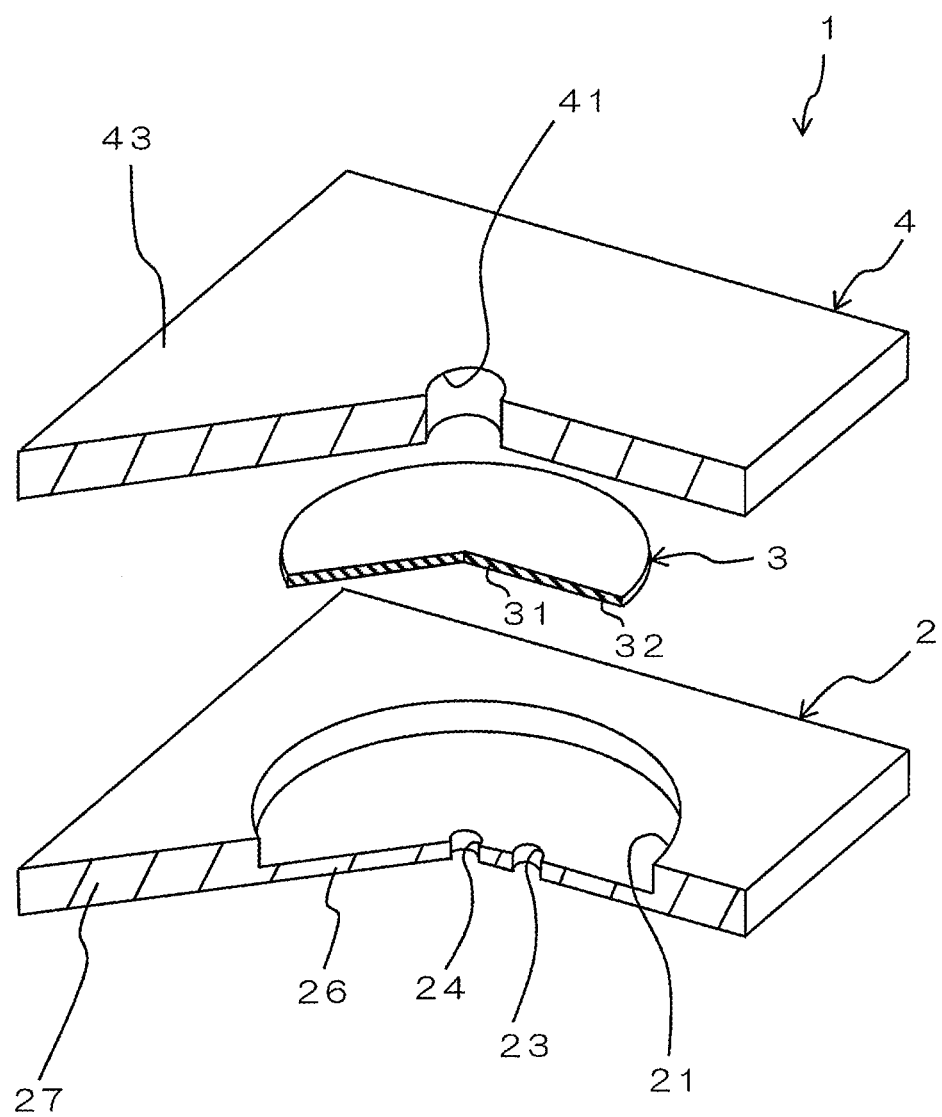
FIG. 2 is an exploded perspective view of the microvalve shown in FIG. 1.
Figure 3:
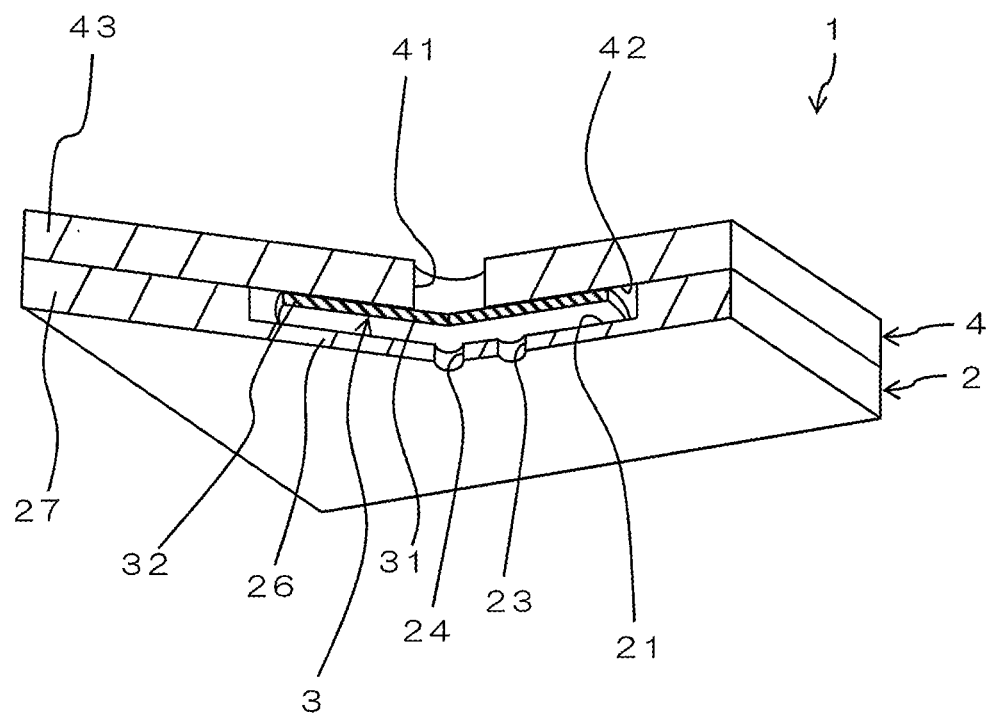
FIG. 3 is a perspective view showing a state in which the microvalve is viewed from below.
Figure 4:
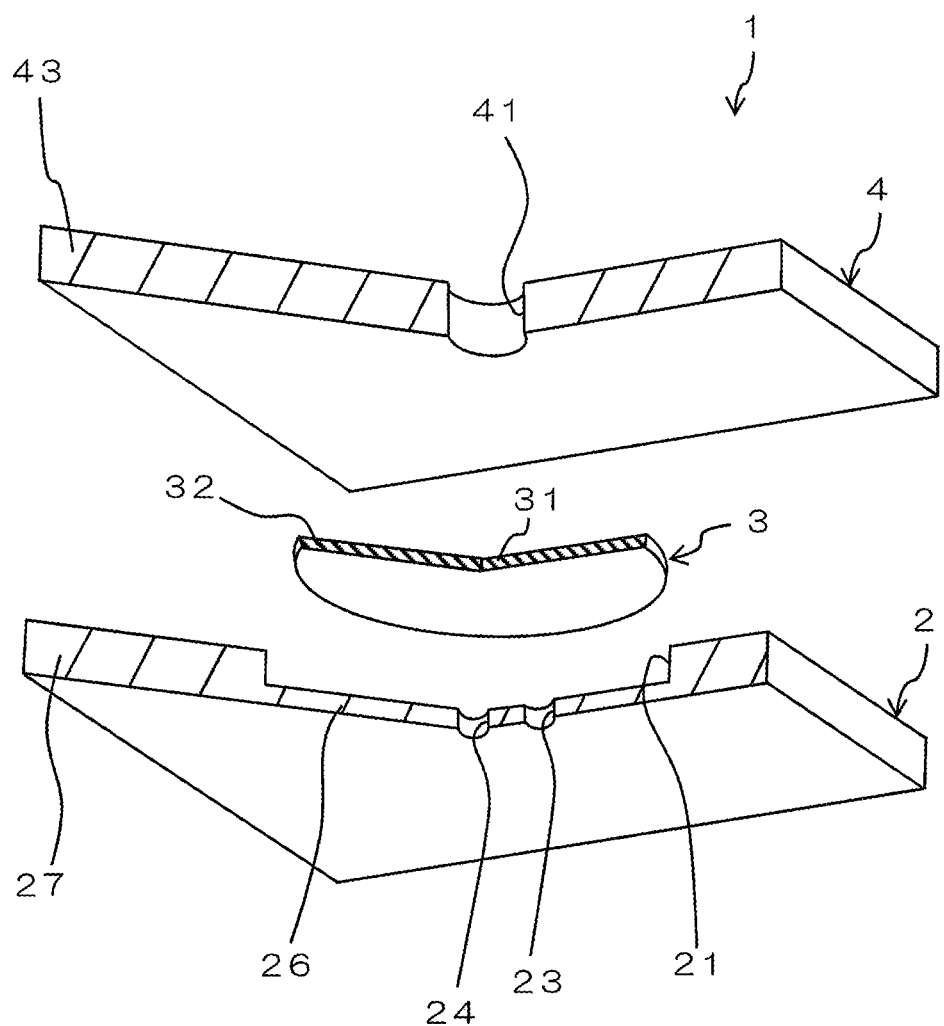
FIG. 4 is an exploded perspective view of the microvalve shown in FIG. 3.

FIG. 1 is a perspective view showing a configuration example of a microvalve 1 according to one embodiment of the present invention, showing a state in which the microvalve 1 is viewed from above. FIG. 2 is an exploded perspective view of the microvalve 1 shown in FIG. 1. FIG. 3 is a perspective view showing a state in which the microvalve 1 is viewed from below. FIG. 4 is an exploded perspective view of the microvalve 1 shown in FIG. 3. Note that FIGS. 1 to 4 show states in which a part of the microvalve 1 has been cut away.

In the following description, when a direction of the microvalve 1 is referred to, the states shown in FIGS. 1 to 4 are taken as upper and lower references. That is, the upper side of the drawing is the upper side and the lower side of the drawing is the lower side. Further, a vertical direction coincides with an axial direction of the microvalve 1. That is, the upper side is one axial side and the lower side is the other axial side.

The microvalve 1 is a plate-shaped member having a square shape in a plan view and a predetermined thickness, and has a laminated structure in which a plurality of (two layers of) flat members are laminated. Specifically, the microvalve 1 includes a base layer 2 and a cover layer 4 as a layer structure. In addition, the microvalve 1 includes a diaphragm layer 3 disposed between the base layer 2 and the cover layer 4. A dimension of the microvalve 1 in a width direction (lateral direction) and a dimension of the microvalve 1 in an orthogonal direction (front-rear direction) orthogonal to the width direction are each about 1 cm. The base layer 2 and the cover layer 4 are microfabricated by micro electro mechanical systems (MEMS) technology.

As shown in FIG. 2, the base layer 2 is a layer located at the lowermost position in the microvalve 1. The base layer 2 is formed in a flat shape being square in a plan view, and is made of glass or silicon. In the base layer 2, a recess 21, an inlet 23, and an outlet 24 are formed.

The recess 21 is located in a center portion of the base layer 2. The recess 21 has a circular shape in a plan view and is recessed downward from the upper surface of the base layer 2. In the base layer 2, a portion located below the recess 21 is a contact portion 26, and a portion located outside the recess 21 and the contact portion 26 is a close contact portion 27.

The inlet 23 is formed as a through hole located in a center portion (contact portion 26) of the base layer 2. The inlet 23 has a circular shape in a plan view and penetrates the contact portion 26 in the thickness direction. The inlet 23 communicates with the recess 21. Gas flows into the microvalve 1 via this inlet 23.

The outlet 24 is formed as a through hole located in the center portion (contact portion 26) of the base layer 2. Specifically, the outlet 24 is located near the inlet 23 with a space therefrom. The outlet 24 has a circular shape in a plan view and penetrates the contact portion 26 in the thickness direction. The outlet 24 communicates with the recess 21. The gas flowing into the microvalve 1 via the inlet 23 flows out of the microvalve 1 via the outlet 24.

As shown in FIGS. 2 and 4, the cover layer 4 is located above the base layer 2 and faces the base layer 2. The cover layer 4 is formed in a flat shape being square in a plan view, and is made of glass or silicon. The outer shape of the cover layer 4 is formed to be substantially the same as the outer shape of the base layer 2. An opening 41 is formed in the cover layer 4. The opening 41 is located at the center of the cover layer 4. The opening 41 has a circular shape in a plan view and penetrates the cover layer 4 in the thickness direction. As will be described later, a lower surface 42 of the cover layer 4 functions as a mounting surface to which the diaphragm layer 3 is attached.

The diaphragm layer 3 is attached to the lower surface 42 of the cover layer 4. The diaphragm layer 3 is formed in the shape of a thin film being circular in a plan view, and is made of glass or silicon. The diameter of the diaphragm layer 3 is smaller than the diameter of the recess 21 of the base layer 2. When the diaphragm layer 3 is formed of a glass film, its thickness is preferably from 5 to 20 µm. When the diaphragm layer 3 is formed of a silicon film, its thickness is preferably from 10 to 150 µm. Since the diaphragm layer 3 is extremely thin, the diaphragm layer 3 has flexibility and is configured to be easily elastically deformable.

The opening and the recess in the base layer 2 and the cover layer 4 are formed in advance in each layer by etching or blasting. The base layer 2, the diaphragm layer 3, and the cover layer 4 are subjected to deactivation treatment in advance. Then, the base layer 2, the diaphragm layer 3, and the cover layer 4 subjected to these treatments are laminated to constitute the microvalve 1. Note that the deactivation treatment on each layer (the base layer 2, the diaphragm layer 3, and the cover layer 4) may be performed after lamination of the base layer 2, the diaphragm layer 3, and the cover layer 4. That is, the deactivation treatment on each layer can be performed either before or after lamination of each layer.

Specifically, as shown in FIGS. 1 and 3, an outer edge 32 of the diaphragm layer 3 is attached to the lower surface 42 of the cover layer 4 by welding (laser welding). At this time, the axis of the diaphragm layer 3 and the axis of the cover layer 4 coincide with each other. Note that an annular mounting portion slightly protruding downward may be provided on the lower surface 42 of the cover layer 4, and the outer edge 32 of the diaphragm layer 3 may be attached to the lower surface of the mounting portion by welding. In this case, the lower surface of the mounting portion constitutes a mounting surface.

Further, the close contact portion 27 of the base layer 2 and the outer edge 43 of the cover layer 4 are bonded to each other. For the bonding between the base layer 2 and the cover layer 4, anodic bonding can be used when the base layer 2 and the cover layer 4 are made of dissimilar materials, and diffusion bonding can be used when the base layer 2 and the cover layer 4 are made of the same material. It is also possible to fix the base layer 2 and the cover layer 4 by welding.

In a state where the microvalve 1 is configured, the base layer 2 and the cover layer 4 face each other, and the diaphragm layer 3 is disposed between the base layer 2 and the cover layer 4. Further, the diaphragm layer 3 faces the contact portion 26 of the base layer 2 with a space therebetween. Specifically, a center portion 31 of the diaphragm layer 3 faces the inlet 23 and the outlet 24 of the base layer 2 with a space therebetween. A dimension (gap) between the diaphragm layer 3 and the contact portion 26 of the base layer 2 is, for example, from 5 to 20 µm, and is preferably about 10 µm.

In this manner, a space is formed between the diaphragm layer 3 and the contact portion 26 of the base layer 2, through which the gas can flow from the inlet 23 to the outlet 24. When a pneumatic fluid is introduced from the opening 41 in this state, the diaphragm layer 3 is elastically deformed by the pressure of the pneumatic fluid, and the diaphragm layer 3 comes into close contact with the contact portion 26, so that the inlet 23 and the outlet 24 can be blocked. As the pneumatic fluid, for example, a gas such as air, nitrogen gas or helium gas can be used. As a gas introduced into the microvalve 1 from the inlet 23, a sample gas to be an analysis target can be exemplified, but the gas is not limited thereto.

2. Operation of Microvalve

Hereinafter, the operation of the microvalve 1 will be described with reference to FIGS. 5 and 6.

Figure 5:
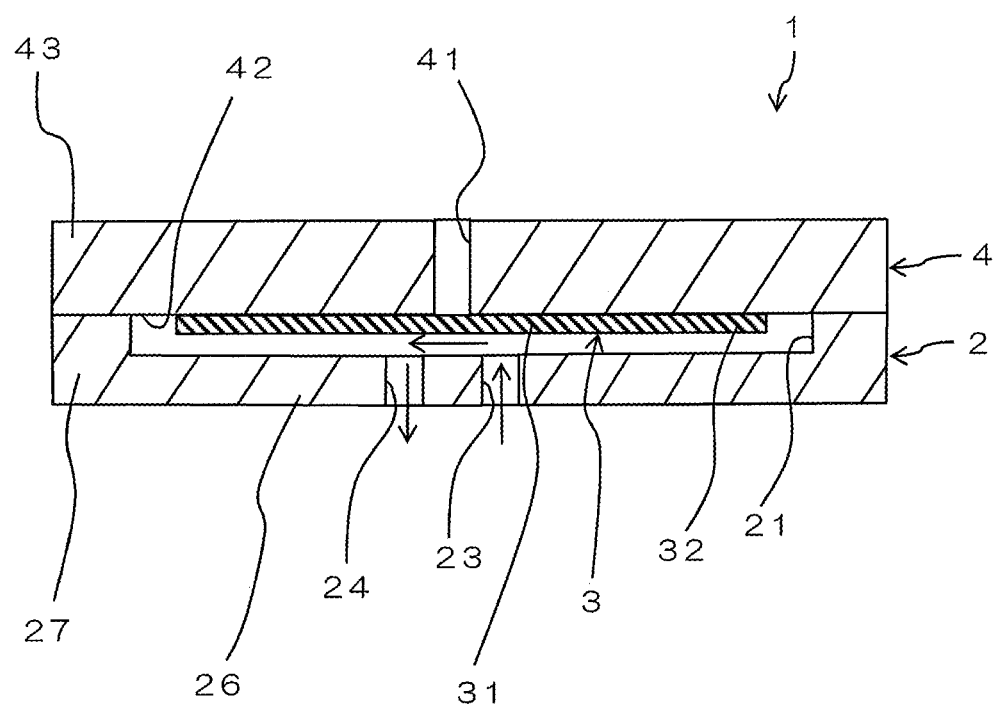
FIG. 5 is a sectional view showing a configuration example of the microvalve, showing a state in which no pneumatic fluid is introduced into the microvalve.
Figure 6:
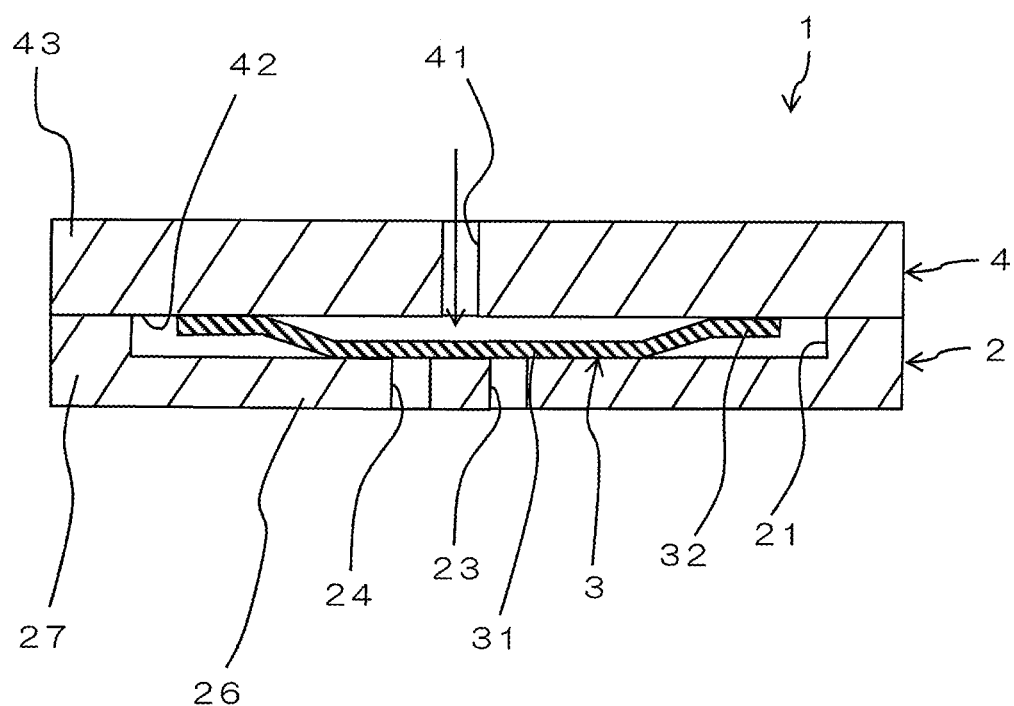
FIG. 6 is a sectional view showing a configuration example of the microvalve, showing a state in which a diaphragm layer is elastically deformed by introduction of the pneumatic fluid.

FIGS. 5 and 6 are sectional views showing a configuration example of the microvalve 1. FIG. 5 shows a state in which no pneumatic fluid is introduced into the microvalve 1. FIG. 6 shows a state in which the diaphragm layer 3 is elastically deformed by introduction of the pneumatic fluid into the microvalve 1. Although not shown in FIGS. 5 and 6, the microvalve 1 is used in a state where a flow path for inflow and outflow of the sample gas is connected to the lower surface side of the base layer 2 of the microvalve 1, and a flow path for introducing a pneumatic fluid is connected to the upper surface side of the cover layer 4.

In the state shown in FIG. 5, no pneumatic fluid has been introduced into the microvalve 1. In this state, the diaphragm layer 3 is in close contact with the lower surface 42 of the cover layer 4. Further, a space (gap) is formed between the diaphragm layer 3 and the base layer 2 (contact portion 26), and the center portion 31 of the diaphragm layer 3 faces the inlet 23 and the outlet 24 of the base layer 2 with spaces therebetween. At this time, the microvalve 1 is in an opened state.

In this state, the sample gas is supplied into the microvalve 1. The sample gas is supplied from the inlet 23 of the base layer 2 into the microvalve 1. Then, the sample gas passes through the space between the diaphragm layer 3 and the contact portion 26 of the base layer 2, passes through the outlet 24 of the base layer 2, and flows to the outside of the microvalve 1.

On the other hand, when the flow path of the sample gas is to be closed in the microvalve 1, that is, when the microvalve 1 is to be brought into a closed state, the pneumatic fluid is supplied to the microvalve 1 as shown in FIG. 6.

Then, the center portion 31 of the diaphragm layer 3 is pressed toward the lower side (toward the base layer 2 side) by the pressure of the pneumatic fluid. As a result, the center portion 31 of the diaphragm layer 3 is elastically deformed toward the lower side (toward the base layer 2 side) and adheres tightly to the contact portion 26 of the base layer 2. Since the diaphragm layer 3 is formed into a thin film and is soft, the diaphragm layer 3 and the contact portion 26 of the base layer 2 come into close contact with each other in a state of high airtightness.

Then, the center portion 31 of the diaphragm layer 3 blocks the inlet 23 and the outlet 24 of the base layer 2 to close the flow path of the sample gas, thereby bringing the microvalve 1 into the closed state.

When the supply of pneumatic fluid into the microvalve 1 is stopped, the diaphragm layer 3 returns to the original state as shown in FIG. 5 in response to the elastic force of the diaphragm layer 3, and the microvalve 1 comes into the opened state.

By introducing the pneumatic fluid into the microvalve 1 in this manner, the diaphragm layer 3 is elastically deformed, the center portion 31 is brought into close contact with the contact portion 26 of the base layer 2, and the microvalve 1 comes into the closed state. In addition, as the supply of the pneumatic fluid into the microvalve 1 is stopped, the diaphragm layer 3 returns to the original state, and the microvalve 1 comes in the opened state.

The above microvalve 1 can be used as a valve provided in various devices. Further, by preparing a plurality of microvalves 1 and using each microvalve 1 as a port, it is possible to perform the same operation as the multiport valve.

3. Configuration and Operation of Valve System

Figure 7B:
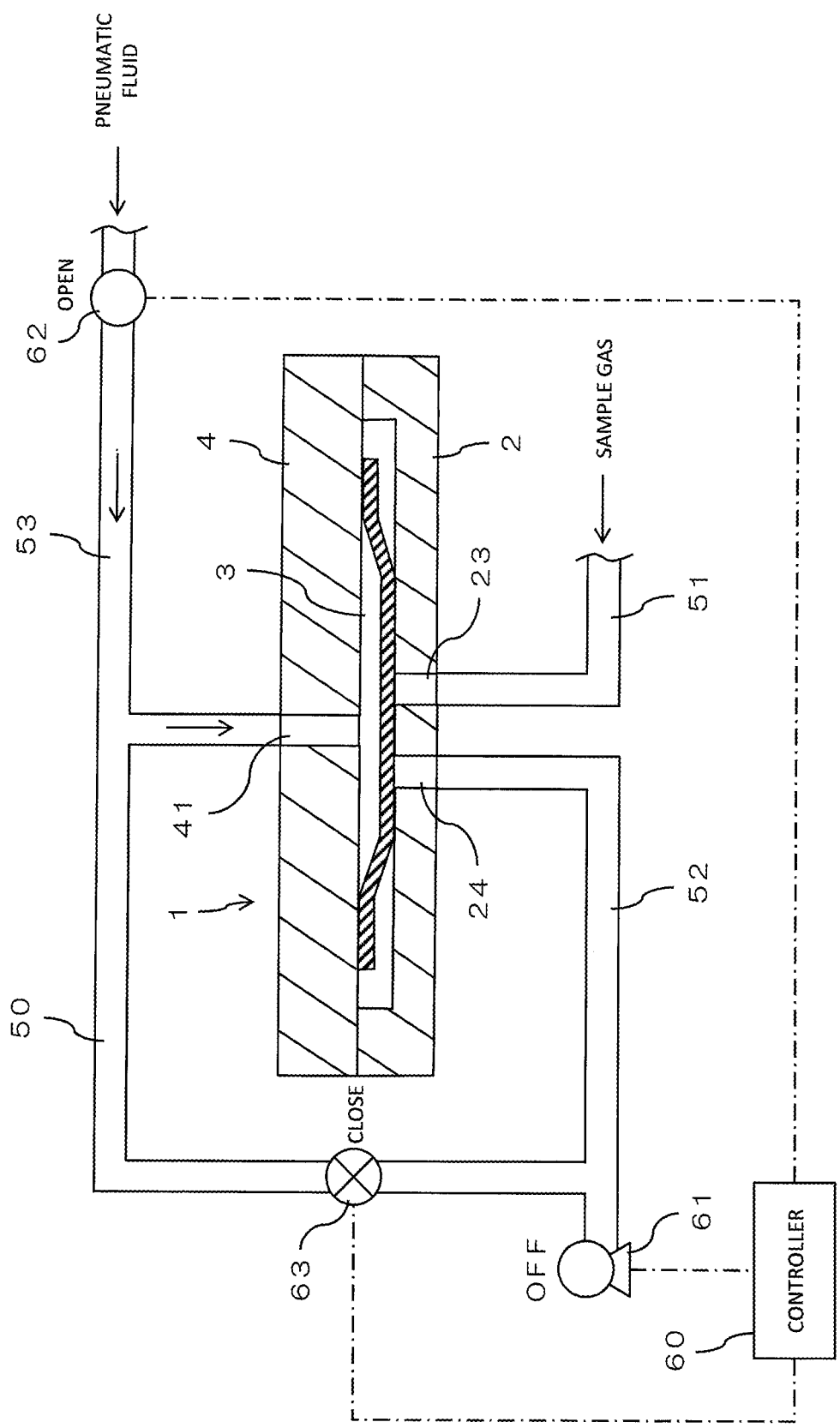
FIG. 7B is a schematic view showing a configuration example of a valve system by using the microvalve shown in FIGS. 1 to 6, showing a state in which the microvalve is closed.

FIGS. 7A and 7B are schematic views showing a configuration example of a valve system using the microvalve 1 of FIGS. 1 to 6. FIG. 7A shows a state in which the microvalve 1 is opened, and FIG. 7B shows a state in which the microvalve 1 is closed.

A first flow path 51 through which the sample gas is introduced into the microvalve 1 is connected to the inlet 23 of the microvalve 1. A second flow path 52 through which the sample gas is allowed to flow out of the microvalve 1 is connected to the outlet 24 of the microvalve 1. A third flow path 53 through which the pneumatic fluid introduced into the microvalve 1 is connected to the opening 41 of the microvalve 1.

A pump 61 is connected to the second flow path 52 on the opposite side to the microvalve 1 side. By driving the pump 61, the gas in the second flow path 52 is sucked from the microvalve 1 side to the pump 61 side. Therefore, when the pump 61 is driven while the microvalve 1 is in the opened state as shown in FIG. 7A, the second flow path 52 comes into a more negative-pressure state than the first flow path 51, and the sample gas is sucked from the first flow path 51 to the second flow path 52 side via the microvalve 1. In this manner, the pump 61 constitutes a negative pressure generation mechanism for generating a negative pressure on the second flow path 52 side.

In the third flow path 53, a valve 62 is provided. By opening this valve 62, the pneumatic fluid flows into the microvalve 1 via the third flow path 53 to enable elastic deformation of the diaphragm layer 3. As shown in FIG. 7A, when the pump 61 is driven, the valve 62 is closed and the introduction of the pneumatic fluid into the microvalve 1 is stopped. On the other hand, as shown in FIG. 7B, when the driving of the pump 61 is stopped, the valve 62 is opened and the pneumatic fluid is introduced into the microvalve 1, whereby the diaphragm layer 3 is elastically deformed and the microvalve 1 comes into the closed state.

A connection flow path 50 connects an intermediate portion of the second flow path 52 and an intermediate portion of the third flow path 53. A valve 63 is provided in the connection flow path 50, and the connection flow path 50 can be opened and closed by this valve 63. The connection flow path 50 and the valve 63 constitute a pressure adjustment mechanism configured to reduce the pressure difference between the inside of the second flow path 52 and the inside of the third flow path 53.

A controller 60 is connected to the pump 61 and the valves 62, 63. The controller 60 has a configuration including, for example, a central processing unit (CPU), and controls the operation of the pump 61 and the valves 62, 63 by the CPU executing the program. As shown in FIG. 7A, when the pump 61 is driven, the valve 62 comes into the closed state and the valve 63 comes into the opened state. On the other hand, as shown in FIG. 7B, when the driving of the pump 61 is stopped, the valve 62 comes into the opened state and the valve 63 comes into the closed state.

That is, the controller 60 causes the valve 62 to be opened thereby supplying the pneumatic fluid into the microvalve 1 in a state where the connection flow path 50 is closed with the valve 63 (cf. FIG. 7B). The controller 60 causes the valve 62 to be closed thereby stopping the supply of the pneumatic fluid into the microvalve 1 in a state where the connection flow path 50 is opened with the valve 63 (see FIG. 7A).

As shown in FIG. 7A, when the pump 61 is driven, by opening the valve 63, the second flow path 52 and the third flow path 53 come into a communicated state. In this state, the pressure difference between the second flow path 52 and the third flow path 53 decreases, thereby enabling reduction in elastic deformation of the diaphragm layer 3 in response to the negative pressure generated on the second flow path 52 side. It is thus possible to prevent the inlet 23 and the outlet 24 from being blocked by the diaphragm layer 3 at the time of sucking the sample gas by the negative pressure. In particular, in the present embodiment, the pressure difference between the inside of the second flow path 52 and the inside of the third flow path 53 can be reduced with a simple configuration just to open and close the connection flow path 50 by the valve 63.

When the connection flow path 50 is opened with the valve 63, the supply of the pneumatic fluid into the microvalve 1 is stopped by closing the valve 62. Thus, at the time of reducing the pressure difference between the inside of the second flow path 52 and the inside of the third flow path 53, it is possible to prevent the pneumatic fluid from flowing from the second flow path 52 to the third flow path 53 via the connection flow path 50.

In the case where the diaphragm layer 3 is formed of a glass film having a thickness of 5 to 20 μm, the diaphragm layer 3 receives a pressure of, for example, 5 to 600 kPa from the pneumatic fluid and is elastically deformed, whereby the inlet 23 and the outlet 24 is blocked. On the other hand, when the diaphragm layer 3 is formed of a silicon film having a thickness of 10 to 150 μm, the diaphragm layer 3 receives a pressure of, for example, 20 to 1000 kPa from the pneumatic fluid and is elastically deformed, whereby the inlet 23 and the outlet 24 is blocked.

As described above, in the present embodiment, it is possible to form the diaphragm layer 3 with a relatively thin glass film or silicon film, and elastically deform the diaphragm layer 3 at a relatively low pressure to block the inlet 23 and the outlet 24. In this case, there is a concern that the diaphragm layer 3 is elastically deformed at the time of sucking the sample gas from the inlet 23 (see FIG. 7A), to block the inlet 23 and the outlet 24. However, in the present embodiment, it is possible to reduce elastic deformation of the diaphragm layer 3 by the action of the pressure adjustment mechanism (the valve 63), so that at the time of sucking the sample gas by the negative pressure, the inlet 23 and the outlet 24 can be reliably prevented from being blocked by the diaphragm layer 3.

4. Application Example of Valve System

Figure 8A:
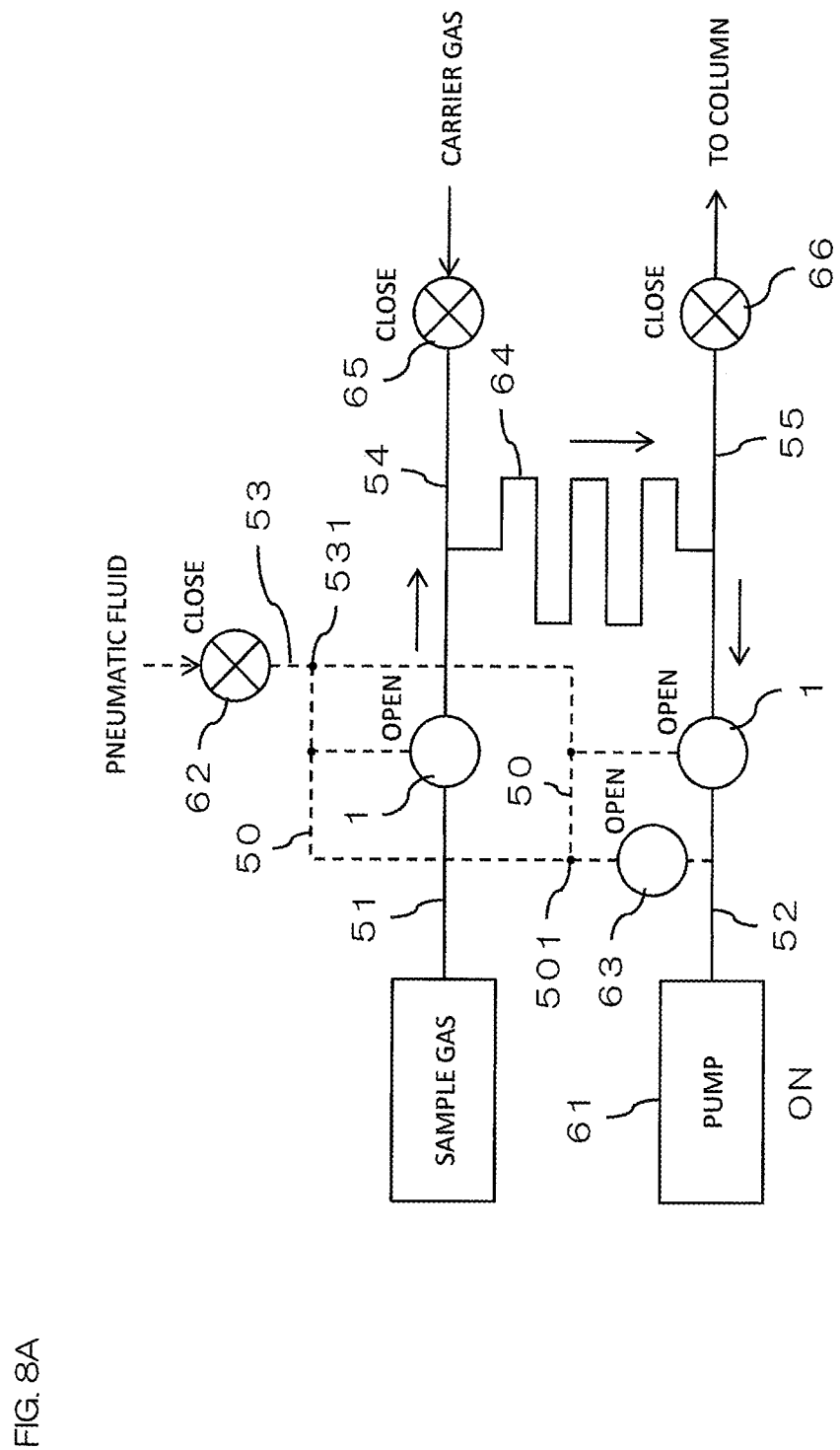
FIG. 8A is an example of a flow-path diagram in the case of applying the valve system of FIGS. 7A and 7B to a gas sampler, showing a state at the time of sampling.
Figure 8B:
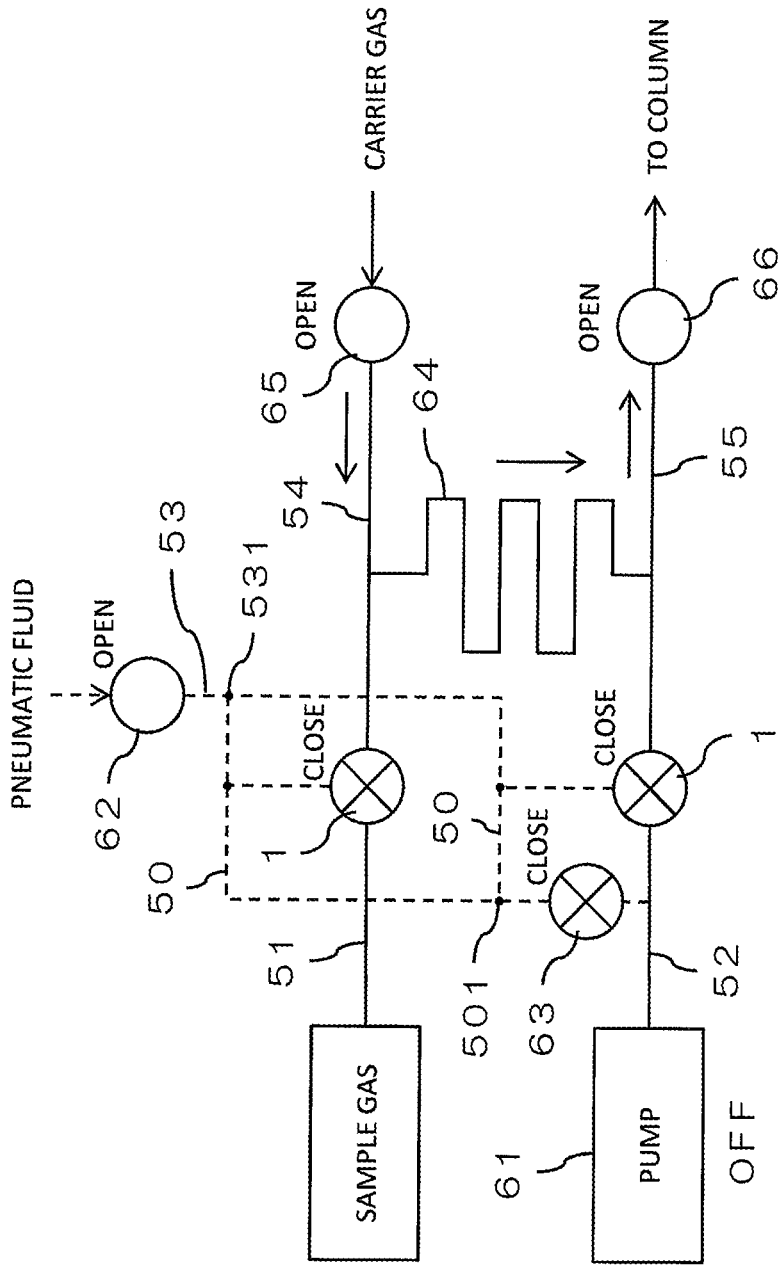
FIG. 8B is an example of a flow-path diagram in the case of applying the valve system of FIGS. 7A and 7B to the gas sampler, showing a state at the time of injection.
Figure 8C:
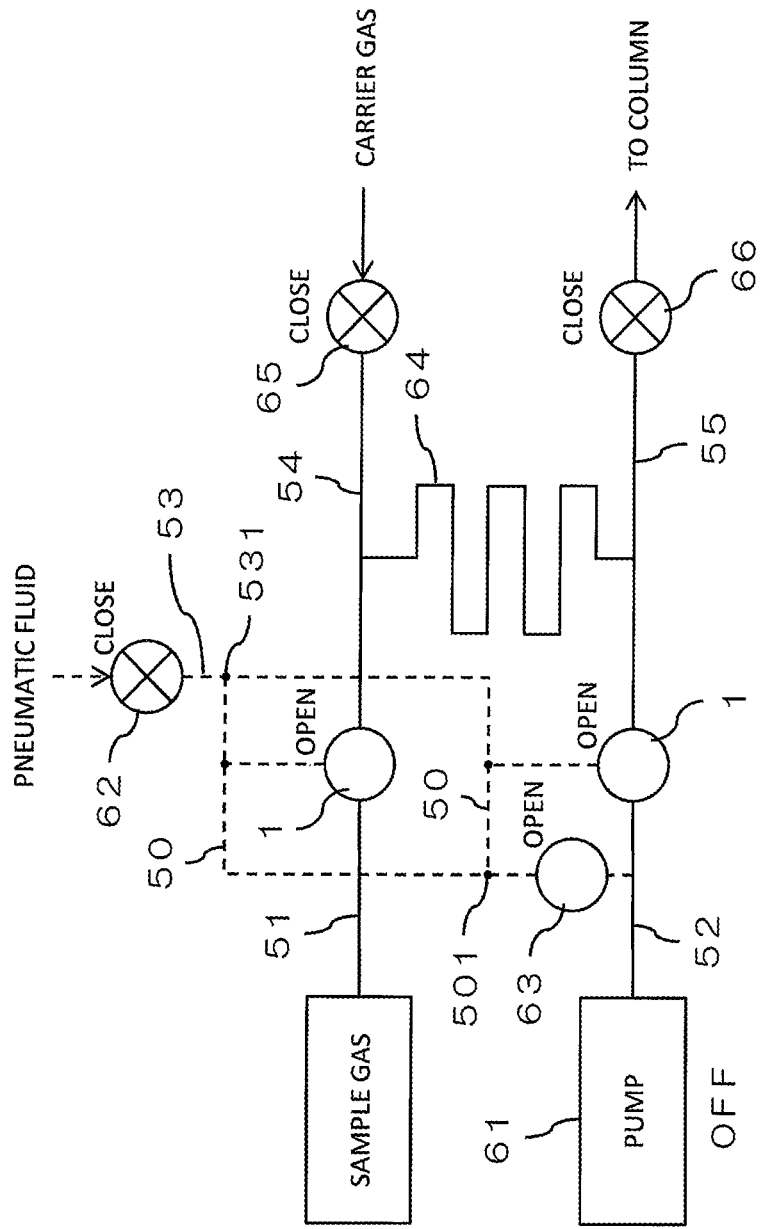
FIG. 8C is an example of a flow-path diagram in the case of applying the valve system of FIGS. 7A and 7B to the gas sampler, showing a state at the time of analysis.

FIGS. 8A to 8C are examples of a flow-path diagram in the case of applying the valve system of FIGS. 7A and 7B to a gas sampler. FIG. 8A shows a state at the time of sampling, FIG. 8B shows a state at the time of injection, and FIG. 8C shows a state at the time of analysis. In this example, two microvalves 1 are provided in series in the flow path from the supply source of the sample gas to the pump 61. In addition, a sample loop 64 is provided in the flow path between the two microvalves 1.

The third flow path 53, which is a flow path of the pneumatic fluid, branches off at a branch portion 531 downstream of the valve 62 and is connected to the openings 41 of the two microvalves 1, respectively. Further, each of the third flow paths 53 branched at the branch portion 531 is connected to the second flow path 52 via the connection flow path 50. Each connection flow path 50 merges into one connection flow path 50 at a confluence portion 501 and is then connected to the second flow path 52. The valve 63 for opening and closing the connection flow path 50 is provided in the connection flow path 50 downstream of the confluence portion 501.

A fourth flow path 54 for supplying a carrier gas to a sample loop 64 is connected to the flow path between the sample loop 64 and the upstream microvalve 1. A fifth flow path 55 for supplying a carrier gas from the sample loop 64 to a column (not shown) is connected to the flow path between the sample loop 64 and the downstream microvalve 1. A valve 65 is provided in the fourth flow path 54, and a valve 66 is provided in the fifth flow path 55. Note that the microvalve 1 may constitute the valves 65, 66, and in that case, the valves 65, 66 can be opened and closed by the pneumatic fluid.

At the time of filling the sample loop 64 with the sample, as shown in FIG. 8A, the valves 65, 66 are brought into the closed state, and each microvalve 1 is then brought into the opened state. By driving the pump 61 in this state, the sample gas is supplied to the sample loop 64 via the first flow path 51, and the sample loop 64 is filled with an analysis target component (sample) contained in the sample gas.

At this time, the valve 62 is in the closed state, and no pneumatic fluid flows into each microvalve 1. In addition, the valve 63 is in the opened state, and the second flow path 52 and the third flow path 53 communicate with each other via the connection flow path 50. It is thus possible to reduce elastic deformation of the diaphragm layer 3 of the microvalve 1 in response to the negative pressure generated on the second flow path 52 side, so that at the time of sucking the sample gas by the negative pressure, the inlet 23 and the outlet 24 of the microvalve 1 can be prevented from being blocked by the diaphragm layer 3.

Thereafter, as shown in FIG. 8B, as the valve 62 comes into the opened state, the pneumatic fluid flows into each microvalve 1, and each microvalve 1 comes into the closed state. At this time, while the driving of the pump 61 is stopped, the valve 63 comes into the closed state and the valves 65, 66 come into the opened state. Thereby, the carrier gas is supplied into the sample loop 64 via the fourth flow path 54, and the carrier gas having passed through the sample loop 64 is supplied to the column via the fifth flow path 55. As a result, the sample filled in the sample loop 64 is desorbed and is introduced (injected) into the column together with the carrier gas.

After the introduction of the sample into the column in this manner, analysis is carried out by supplying the carrier gas to the column. During the analysis, as shown in FIG. 8C, the valves 65, 66 are brought into the closed state while the driving of the pump 61 is stopped, and then each microvalve 1 is brought into the opened state. At this time, the valve 62 is in the closed state, and no pneumatic fluid flows into each microvalve 1.

5. Modified Example of Bubble System

Figure 9A:
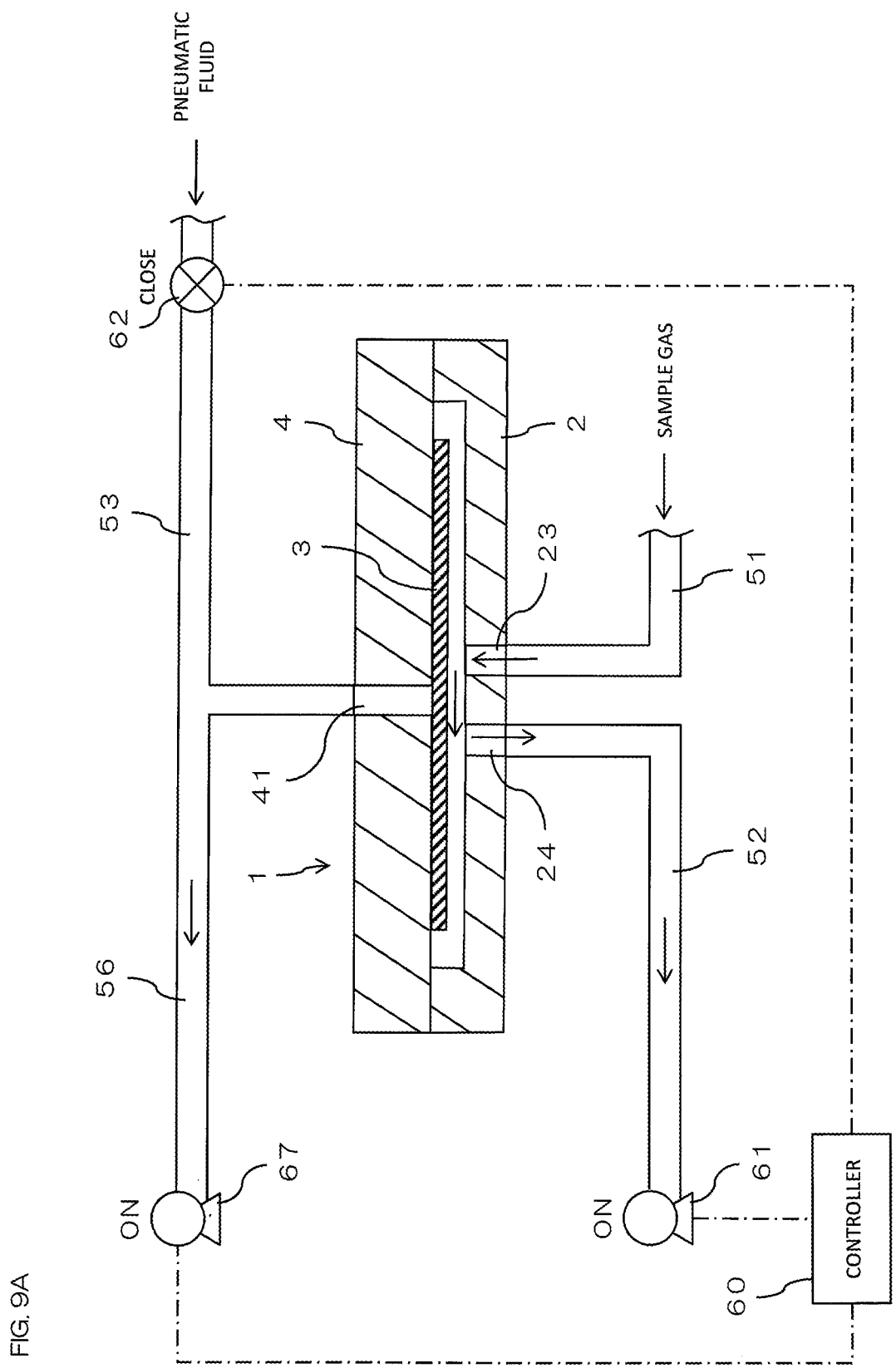
FIG. 9A is a schematic view showing a modified example of the valve system, showing a state in which the microvalve is opened.

FIGS. 9A and 9B are schematic diagrams showing a modified example of the valve system. FIG. 9A shows a state in which the microvalve 1 is opened, and FIG. 9B shows a state in which the microvalve 1 is closed.

In the above embodiment, the configuration using the valve 63 as the pressure adjustment mechanism has been described. However, in this modified example, a pump 67 is used as the pressure adjustment mechanism instead of the valve 63, and the second flow path 52 and the third flow path 53 are not connected to each other by the connection flow path 50. Except for that point, the modified example is the same as the above embodiment, so the same reference numerals are provided in the figures for the same configuration and the detailed description thereof will be omitted.

The pump 67 is provided in a branch flow path 56 branching from the third flow path 53. Controlling the driving of the pump 67 by the controller 60 can reduce the pressure difference between the second flow path 52 and the third flow path 53.

Specifically, as shown in FIG. 9A, when the pump 61 is driven, the pump 67 is also driven. A suction pressure of each pump 61, 67 is set to be equal. This reduces the pressure difference between the second flow path 52 and the third flow path 53, so that it is possible to reduce the elastic deformation of the diaphragm layer 3 in response to the negative pressure generated on the second flow path 52 side. It is thus possible to prevent the inlet 23 and the outlet 24 from being blocked by the diaphragm layer 3 at the time of sucking the sample gas by the negative pressure.

When the driving of the pump 61 is stopped, the driving of the pump 67 is also stopped as shown in FIG. 9B. By the valve 62 being opened in this state, the pneumatic fluid is introduced into the microvalve 1, the diaphragm layer 3 is elastically deformed, and the microvalve 1 comes into the closed state.

6. Another Modified Example

In the above embodiment, the configuration has been described where a negative pressure is generated on the second flow path 52 side by the pump 61. However, the present invention is not limited to such a configuration. For example, the negative pressure generation mechanism for generating the negative pressure on the second flow path 52 side may be made up of a depressurized tank or the like provided on the second flow path 52 side.

What is claimed is:

1. A valve system comprising:
   a microvalve having a laminated structure including a base layer on which an inlet and an outlet for gas are formed, a cover layer facing the base layer, and a diaphragm layer that is provided between the base layer and the cover layer and is elastically deformable in response to a flow of a pneumatic fluid, to block the inlet and the outlet, the diaphragm layer having first and second sides;
   a first flow path that is connected to the inlet for introducing gas into the microvalve, the first flow path being connected to the first side of the diaphragm layer;

a second flow path that is connected to the outlet for allowing gas to flow out of the microvalve, the second flow path being connected to the first side of the diaphragm layer, the second flow path being fluidly connectable to the first flow path;

a third flow path for introducing the pneumatic fluid into the microvalve, the third flow path being connected to the second side of the diaphragm layer;

a connection flow path connecting the second flow path and the third flow path;

a negative pressure generation mechanism for generating a negative pressure on the second flow path and the connection flow path;

a first valve configured to open and close the third flow path;

a second valve that is operable to open and close the connection flow path; and a controller configured to cause the first valve to be closed and second valve to be opened in a state where the negative pressure generation mechanism is activated to generate negative pressures on both of the connection flow path and the second flow path to reduce a pressure difference between the first and second sides of the diaphragm layer.

2. The valve system according to claim 1, wherein the controller is configured to cause the pneumatic fluid to be supplied into the microvalve with the connection flow path being closed with the second valve, and causes supply of the pneumatic fluid into the microvalve to be stopped with the connection flow path being opened with the second valve.

3. The valve system according to claim 1, wherein the diaphragm layer is formed of a glass film having a thickness of 5 to 20 μm and is elastically deformable at a pressure of 5 to 600 kPa received from the pneumatic fluid to block the inlet and the outlet.

4. The valve system according to claim 1, wherein the diaphragm layer is formed of a silicon film having a thickness of 10 to 150 μm and is elastically deformable at a pressure of 20 to 1000 kPa received from the pneumatic fluid to block the inlet and the outlet.

5. The valve system according to claim 1, wherein the third flow path is provided separately from the first flow path, and the pneumatic fluid in the third flow path does not flow into the first flow path.

6. A valve system comprising:

a microvalve having a laminated structure including a base layer on which an inlet and an outlet for gas are formed, a cover layer facing the base layer, and a diaphragm layer that is provided between the base layer and the cover layer and is elastically deformable in response to a flow of a pneumatic fluid, to block the inlet and the outlet;

a first flow path that is connected to the inlet for introducing gas into the microvalve;

a second flow path that is connected to the outlet for allowing gas to flow out of the microvalve;

a third flow path for introducing the pneumatic fluid into the microvalve;

a negative pressure generation mechanism for generating a negative pressure on a second flow path side to suck gas from the first flow path forward the second flow path via the microvalve; and a pressure adjustment mechanism for reducing a pressure difference between the second flow path and the third flow path to prevent the inlet and the outlet from being blocked by the diaphragm layer in response to the negative pressure generated on the second flow path side, wherein the diaphragm layer is formed of a glass film having a thickness of 5 to 20 μm and is elastically deformable at a pressure of 5 to 600 kPa received from the pneumatic fluid to block the inlet and the outlet.

* * * * *